Aug. 11, 1964  R. R. HAGER  3,143,929
FULL POWER FLUID PRESSURE SERVOMOTOR CONTRUCTION
Filed Jan. 2, 1962

INVENTOR.
ROBERT R. HAGER
BY
William P. Hickey
ATTORNEY

United States Patent Office 3,143,929
Patented Aug. 11, 1964

3,143,929
FULL POWER FLUID PRESSURE SERVOMOTOR CONSTRUCTION
Robert R. Hager, South Bend, Ind., assignor to The Bendix Corporation, South Bend, Ind., a corporation of Delaware
Filed Jan. 2, 1962, Ser. No. 163,481
3 Claims. (Cl. 91—391)

The present invention relates to fluid pressure motors of the type having movable walls which separate during power actuation; and more particularly to fluid pressure servomotors of the type wherein its control valve structure is mounted on a reaction diaphragm which normally remains stationary as its power diaphragm moves away, and wherein the diaphragms interfit during manual actuation.

An object of the present invention is the provision of a new and improved arrangement for interfitting diaphragm structures of fluid pressure motors which is separate from each other during some phases of operation and are moved into interfitting relationship during other phases of operation—which structure is simple in design, rugged in construction and inexpensive to manufacture.

The invention resides in certain structures and combinations and arrangements of parts; and further objects and advantages of the present invention will become apparent to those skilled in the art to which it relates from the following description of several preferred embodiments described with reference to the accompanying drawings forming a part of this specification, and in which:

FIGURE 1 is a longitudinal cross sectional view through a fluid pressure servomotor embodying principles of the present invention;

FIGURE 2 is a fragmentary cross sectional view of a second embodiment of a fluid pressure motor similar to that shown in FIGURE 1, and showing another arrangement for sealing the periphery of its diaphragms;

FIGURE 3 is a plan view of the internal sealing structure shown in FIGURE 2; and FIGURE 4 is a fragmentary view similar to FIGURE 2 but showing still another sealing arrangement.

The fluid pressure servomotor shown in FIGURE 1 is of the type which is used to power actuate the master cylinder of a hydraulic automotive braking system. The unit shown is of the vacuum suspended type, and employs a pair of power diaphragms 10 and 12, the center portions of which are rigidly connected together to drive the push rod 14 forwardly into the master cylinder, not shown, and thereby cause the hydraulic piston of the master cylinder to displace fluid into the braking system of the automotive vehicle. The servomotor shown in the drawing further includes suitable control valve structure A that is suitably affixed to a reaction diaphragm 16 which is arranged to normally hold the valve structure A adjacent the rear wall of the servomotor. The fluid pressure which is used to drive the power diaphragms 10 and 12 forwardly toward the master cylinder also provides a force upon the reaction diaphragm 16 which urges it in the opposite direction and normally holds it adjacent the rear wall of the servomotor. A rigid partition member 18 is provided between the power diaphragms 10 and 12 so that a low pressure chamber 20 is provided forwardly of the power diaphragm 10, a control chamber 22 is provided between the diaphragm 10 and partition 18, a low pressure chamber 24 is provided between the partition 18 and second power diaphragm 12, and a control pressure chamber 26 is provided between the power diaphragm 12 and the reaction diaphragm 16.

The outer periphery of the diaphragms are sealed with respect to the shell of the servomotor as will be explained; and the power diaphragms 10 and 12 are fastened together by a tubular member 28 which extends through a central opening 30 in the partition member 18 and is slidingly sealed with respect thereto. The power diaphragms 10 and 12 are positioned behind respective rigid diaphragm back-up plates 32 and 34, and the back-up plates are suitably connected to the tubular member 28. The rear end of the tubular member 28 is provided with a flange portion 36 against which the back-up plate abuts; and the central opening through the tubular member 28 is closed off by means of a cast cup-shaped closure member 38 that is positioned behind the diaphragm back-up plate 34 and is suitably bolted to the flange 36. The inner periphery of the power diaphragm 12 is suitably clamped between the closure member 38 and diaphragm back-up plate 34, to hold the diaphragm, and effect a suitable seal therewith. The front end of the tubular member 28 is provided with a shoulder 40, against which the inner portion of power diaphragm 10 is positioned, and sealingly held in place by means of the diaphragm back-up plate 32, and a holddown nut 42 threaded onto the front portion of the tubular member 28. The rear end of the push rod 14 is suitably fastened to the closure member 38 to transmit force from the power diaphragms 10 and 12 to the hydraulic piston of the master cylinder; and a suitable seal 44 is provided between the push rod 14 and the front portion of the servomotor shell to seal off the front low pressure chamber 20.

As previously mentioned, the control valve structure A is carried by the reaction diaphragm 16 so that the control valve structure A may remain substantially stationary as the power diaphragms 10 and 12 move forwardly to actuate the master cylinder. The reaction diaphragm 16 is positioned against the front face of a diaphragm back-up plate 46, and an intermediate section of the diaphragm 16 is sandwiched between the diaphragm back-up plate 46 and a stamped cup-shaped closure member 48. In the normal retracted position of the power diaphragms 10 and 12, the cup-shaped closure member 48 is received by the internal sidewalls of the cup-shaped closure member 38 to suitably center and support the power diaphragm structure, and the reaction producing control valve structure in an aligned relationship.

The control valve structure A generally comprises a two piece tubular housing having front and rear tubular sections 50 and 52 between which the center portion of the reaction diaphragm 16 is sealingly clamped. The front end of the front tubular section 50 projects into the internal chamber of the cup-shaped closure member 48, and is positioned against a rubber reaction disc 54 that is seated in the bottom of the closure member 48. The rear tubular section 52 of the valve housing extends out through a central opening 56 in the rear portion of the housing, and is slidingly sealed with respect thereto. The rear tubular section 52 is held in position against the front tubular section 50 by means of a spring clip 58 which extends through suitable openings in the diaphragm back-up plate 46 to abut a shoulder 60 on the outside surface of the rear tubular member 52. The rear tubular section 52 is further provided with another shoulder 62 which abuts the rear section of the housing of the motor to limit rearward movement of the valve housing.

The servomotor, shown, is of the vacuum suspended type in which vacuum is continually communicated to the low pressure chambers 20, and 24, and to the low pressure chamber 64 between the reaction diaphragm 16 and rear end of the servomotor housing. In the normal released condition of the servomotor shown in the drawing, this vacuum is also communicated to the control pressure chambers 22 and 26; and when it is desired to actuate the unit, atmospheric pressure is bled into the control chambers 22 and 26. In the servomotor shown in the drawing, vacuum from the manifold of the vehicle's engine is continually communicated to the chamber 20 through the vacuum inlet 66, from whence it flows through the tubular member 28 and its stamped passageway 68 to the low pressure chamber 24. Vacuum is communicated to the low pressure chamber 64 through the interconnecting tubing 70.

Atmospheric pressure is communicated to control valve A through an air filter 72 which leads into the area inside of the rubber boot or dirt seal 74 to flow into the open end of the rear section 52 of the tubular valve housing. The internal opening of the rear tubular valve housing section 52 is provided with a shoulder 76 forming a vacuum valve seat against which the front face of an annular rubber sealing member 78 abuts to control vacuum communication into the vacuum chambers 22 and 26. The rear end of the annular rubber sealing member 78 is suitably wedged up against the sidewalls of the tubular valve housing section 52 to isolate the atmosphere from the vacuum valve chamber 80 formed by the shoulder 76 and rubber sealing member 78. The vacuum valve chamber 80 is continually communicated with the vacuum chamber 64 through a plurality of suitable openings 82 through the sidewall of the tubular valve housing section 52.

Flow of atmospheric pressure into the control chambers 22 and 26 is controlled by means of a poppet member 84 which is positioned forwardly of the shoulder 76, and the poppet member includes an annular atmospheric valve seat 86 which extends rearwardly through the central opening 88 of the shoulder 76 into abutment with the rubber sealing member 78. The poppet member 84 is normally biased rearwardly into sealing engagement with the annular rubber seal member 78 by means of a coil spring 90 positioned between suitable shoulders on the poppet member 84 and front tubular section 50 to normally prevent entrance of atmospheric pressure into the servomotor. Movement of the poppet member 84 is controlled by a ball ended actuating rod 92 which extends through the central opening of the rubber sealing member 78 and is suitably affixed to the poppet member 84. The tubular valve housing section 52 is normally held into engagement with the rear end of the servomotor shell by means of a coil spring 94 that is suitably positioned between the shell and the snap ring 96 on the outer end of the tubular valve section 52; and a like coil spring 98 is provided between the actuating rod 92 and a suitable metallic stiffener 100 for the sealing member to provide an initial sealing action with respect to the vacuum and atmospheric valve seats 76 and 86.

In the normal, at rest, condition of the servomotor the parts of the servomotor are as shown in the drawing. In the released condition shown, vacuum from the rear low pressure chamber 64 flows through the openings 82 to the vacuum chamber 80 of the valve. In the position shown, the coil spring 90 holds the atmospheric valve seat 86 sealed with respect to the annular sealing member 78, and further holds it off of the vacuum valve seat 76 to permit vacuum to flow around poppet member 84, through openings 102 and 104 to the control chamber 26. Continual communication between the rear control chamber 26 and from control chamber 22 is provided by means of a sealing structure later to be explained.

Actuation of the servomotor shown is initiated by a forward movement of the control rod 92 which moves the control member 84 forwardly to allow the rubber valve sealing member 78 to follow its atmospheric valve seat 86 until the sealing member 78 abuts the vacuum valve seat 76. Abutment of the sealing member 78 with the vacuum valve seat 76 closes off vacuum communication to the control chambers 22 and 26; and further forward movement of the control rod 92, thereafter lifts the atmospheric valve seat 86 out of engagement with the rubber sealing member 78. This permits atmospheric pressure to flow between the stiffener 100 and actuating rod 92 and past the control member 84. Thus, the atmospheric pressure flows through the openings 102 and 104, and into the control chambers 26 and 22. The construction of the control member 84 is such that, at the time that the atmospheric valve seat 86 moves out of engagement with the rubber sealing member 78, the front surface of the control member 84 will be out of engagement with the rubber reaction disc 54 by a predetermined distance. As atmospheric pressure builds up in the rear control chamber 26, force on the reaction diaphragm 16 pulls the cup-shaped closure member 48 rearwardly with respect to the tubular valve housing section 50. Relative movement between the closure member 48 and valve housing is permitted by reason of the flexible center section of the diaphragm 16 which allows the spring clip 58 to move out of engagement with the shoulder 60 on the rear tubular valve housing section 52. This permits a squeezing of the rubber reaction disc 54 against the annular front surface of the valve housing section 50, to cause it to bulge up against the front face of the control member 84, and thereby provide a reaction force on the control rod 92 which opposes its actuating movement. This force will generally be proportional to the pressure in the control chambers 26 and 22. Atmospheric pressure in the control chambers 22 and 26 produces a differential pressure across the power diaphragms 10 and 12 which moves these diaphragms forwardly to transmit force to the cup-shaped closure members 38, and thence through the push rod 14 to drive the fluid displacement piston of the attached master cylinder.

Control pressure in the control chamber 26 will normally hold the tubular control valve housing section 52 in engagement with the rear end wall of the servomotor. A separation is thereby achieved between the cup-shaped closure member 38 of the power diaphragm structure 12, and the cup-shaped closure member 48 of the reaction diaphragm structure 16. When the desired brake actuation is achieved, actuating force on the control rod 92 is held constant; whereupon a slight amount of additional air pressure bleeds into the control chamber 26 to pull the cup-shaped closure member 48 rearwardly over the tubular valve housing section 50, and thereby cause the rubber reaction disc 54 to be displaced rearwardly against the poppet member 84 until its atmospheric valve seat 86 sealingly engages the annular rubber sealing member 78. This closes off further atmospheric flow into the control chambers 26 and 22 and holds the brake actuation constant.

When it is desired to release the brake actuation, a reduction in applying force on the control rod 92 allows the internal pressure of the rubber reaction disc 54 to bias the control member 84 rearwardly and the cup-shaped closure member 48 to move rearwardly relative to the valve housing 50. This causes the annular rubber sealing member 78 to be lifted out of engagement with the vacuum valve seat 76 to reduce the pressure within the control chambers 26 and 22. As the reaction force produced by diaphragm 16 decreases, the force transferred from the block of rubber 54 to the control member 84 decreases and the force applied by the operator's foot will again cause the control member 84 to move into the rubber reaction disc 54 and again allow the sealing member 78 to abut valve seat 76.

If a complete release of the brake system is desired, all force on the control rod 92 will be removed; whereupon the spring 90 holds the annular sealing member 78 out of engagement with the vacuum valve seat 76 to permit full vacuum to be communicated to the control chambers 26 and 22, and thereby allow the power piston return spring 106 to move the power diaphragms 10 and 12 rearwardly, until they reach the position shown in the drawing. It should be pointed out, that the coil spring 94 is sufficiently strong to hold the tubular valve housing section 52 into engagement with the rear section of the servomotor housing while sufficient actuating force is being applied to the control rod 92 to overcome the poppet return spring 90.

The servomotor shown in the drawing is of the type which can be actuated by manual force during failure of the vacuum supply to the servomotor. When a complete vacuum failure has occurred, forward force upon the control rod 92 causes the control member 84 to be moved forwardly to close off the vacuum valve seat 76, and thereafter open the atmospheric valve seat 86. Inasmuch as no vacuum exists at this time in the low pressure chambers 20, 24 and 64, atmospheric pressure will have already existed in control chambers 22 and 26 so that no differential pressure will be exerted upon the power diaphragms 10 and 12. The actuating force that is applied to the control rod 92, therefore causes the control member 84 to move into engagement with the rubber reaction disc 54 to pressurize the rubber, and cause it to move the cup member 48 forwardly over the inner tubular valve housing section 50. Excessive forward movement of the cup shaped member 48 relative to the valve housing section 50 is prevented, however, by the spring 58 which is affixed to the diaphragm back-up plate 46, and which is in abutment with the shoulder 60 of the rear tubular valve housing section 52. Force on the control member 84, therefore, moves the diaphragm back-up plate 46, and cup-shaped closure member 48 forwardly, to drive the cup-shaped closure member 38 of the power diaphragm structure, and the push rod 14, forwardly.

Where only a partial vacuum failure has occurred, the initial forward force on the control rod 92 will cause the vacuum valve seat 76 to be closed and the atmospheric valve seat 86 to be opened to communicate atmospheric pressure with the control chambers 22 and 26. Inasmuch as some vacuum exists in the low pressure chambers 20, 24, and 64, the power diaphragms 10 and 12 will move forwardly to produce a separation of the cup-shaped closure members 38 and 48. If a greater degree of brake actuation is required than can be produced by the amount of vacuum that is trapped within the low pressure chambers 20 and 24, the force on the control rod 92 will thereafter be greater than the reaction force being exerted on the reaction diaphragm 16 so that the reaction diaphragm structure and its cup-shaped closure member 48 will move forwardly toward the cup-shaped member 48 of the power diaphragm structure. Inasmuch as the control rod 92 bears against a portion of the control valve mechanism A that is positioned forwardly of the guiding seal positioned in the opening 56 of the rear wall of the servomotor, the cup-shaped member 48 will move generally into alignment with the cup-shaped member 38 and thereafter the internal walls of the cup-shaped closure member 38 will guide the cup-shaped closure member 48 into an aligned position for exerting a driving force upon the push rod 14. It will now be seen that the cooperating surfaces of the cup-shaped close members 38 and 48 act as an aligning and centering means for the reaction diaphragm, and power diaphragm structures.

The servomotor shown in the drawing is intended to be manufactured and assembled on a mass production basis so that it is necessary that the numerous internal parts of the servomotor be made in such a way as to be capable of being assembled, and inserted in the shell of the servomotor in a quick and easy manner which assures an adequate seal between the diaphragms and the shell of the servomotor. As previously indicated, this is accomplished by forming the shell of the servomotor in two sections—one section 108 of which is a generally cup-shaped structure having an internal shoulder 110 which faces the open end of the shell section. The outer periphery of the reaction diaphragm 16 is positioned against the shoulder and is held in place by means of a first annular holddown member or ring 112. The abutting face 114 of the holddown ring 112 is provided with a radially outwardly facing shoulder or ledge 116, and the periphery of the reaction diaphragm 16 is provided with a radially inwardly facing molded shoulder 118 which fits up against the shoulder 116 and prevents the withdrawal of the periphery of the diaphragm. The radially outer portion of the rigid partition member 18 is generally cylindrically shaped to provide a second annular holddown member that is positioned outwardly of the first annular holddown member 112. Clearance is provided between the second annular holddown member 120 and the cylindrical surfaces of the shell section 108 to permit the passage of air through the annular space 126 so defined. The outer periphery of the inner end of the second holddown member 120 is provided with a groove or recess 122; and the outer periphery of the first power diaphragm 12 is provided with a molded section which snaps over the inner end of the second annular holddown member, and is received within the groove 122. Inasmuch as low pressure is communicated to the chamber 24 while high pressure is communicated to the control chamber 26, a sealing force is always provided between the second annular member and the diaphragm 12 so long as the periphery of the diaphragm remains in position. The second annular member 120 is biased towards the first annular holddown member 112 as will later be explained to hold the diaphragm in sealing position; and suitable openings 124 are provided in the first annular holddown member 112 to communicate the control chamber 26 with the annular clearance 126 previously mentioned.

The sealing structure shown in the drawing is completed by a molded portion 128 on the periphery of the second power diaphragm 10, which is squeezed between the tapered outer end face of the second annular holddown member 120, and the interal sidewalls of the shell section 108 by means of the closure member 130 forming the remainder of the shell of the servomotor. The end closure section 130 of the shell of the servomotor is provided with a small radial flange section 132 which fits within the open end of the shell section 108, and is biased up against the peripheral section 128 of the second power diaphragm structure 10. The force applied to the peripheral section 128 sandwiches the peripheral portion 122 of the first power diaphragm 12 between the second holddown member 120 and the first holddown member 112, and in turn sandwiches the periphery of the reaction diaphragm 16 between the shoulder 110 and the first annular holddown member 112. The shell section 130 may be held in position in any suitable manner, and as shown in the drawing, is crimped to the shell section 108 once it has been pressed into sealing position in the manner disclosed in the Wesstrom et al. application 112,741, filed May 1, 1961. Communication between the annular clearance 126 and the control chamber 22 is provided by a plurality of suitable openings 134 through the second annular holddown member 120 forwardly of its partition section 18. Flow from the control pressure chamber 26 therefore passes through openings 124 in the first annular holddown member to the annular clearance 126, and then through openings 134 in the second holddown member to the control pressure chamber 22.

The peripheries of the diaphragms 10, 12 and 16 are of course molded with predetermined tolerances, and the holddown members 112 and 120 may also be molded with predetermined tolerances so that a considerable stack-up of tolerances occurs between the shoulder 110 and the flange 132 of the cover member 130. In some instances this stack-up of tolerances will create problems which can be avoided by the embodiment shown in FIGURES 2 and 3 of the drawings. Those portions of the embodiment shown in FIGURES 2 and 3 which correspond to like portions of the embodiment shown in FIGURE 1 are designated by a like reference numeral, characterized further in that a prime mark is affixed thereto. In the embodiment shown in FIGURES 2 and 3, the second annular holddown member 120' is provided with a shoulder 140 on its internal surface which faces the inner end of the second annular holddown member 120'. The inner end of the second annular holddown member 120' is adapted to be positioned against the shoulder 110 so that a generally predetermined distance will exist between the shoulders 110 and 140 at assembly within which the peripheries of the diaphragms 12 and 16 as well as first annular holddown member 142 will be confined. The portion of the shoulder 140 is recessed as at 144, and the first annular holddown member 142 is positioned in the recess 144 between the shoulders 110 and 140. Opposite ends of the first annular holddown member 142 are provided with radially outwardly facing shoulders or ledges 146 and 148, and the peripheries of the diaphragms 12 and 16 are molded with radially inwardly facing shoulders 150 and 152 which are abutted by the ledges 146 and 148, and are therefore held in position.

In some instances it will be desired to provide the ledge 146' on the second annular holddown member 120', as shown in FIGURE 4, so that the reaction diaphragm 16 and first annular holddown member 112 can be placed in the shell section 108 before the assembly comprising the two power diaphragms 10 and 12 and partition member 18 is inserted into the shell section. To aid in this respect, first annular holddown member 142 may be provided with fingers 154 that are positioned about the holddown member 142. The second annular holddown member 120 may be provided with a plurality of longitudinally extending slots 156 (only one of which is shown) on its outer periphery so that the second annular ring 120' can be inserted over the first ring 142 with the fingers 154 received in the slots 156. The slots 156 may be extended outwardly in the form of grooves to intersect the openings 134' and thereby provide flow communication between the openings 124' in the first holddown ring, and the openings 134' in the second holddown ring.

While the invention has been described in considerable detail, I do not wish to be limited to the particular embodiments shown and described; and it is my intention to cover hereby all novel adaptations, modifications, and arrangements thereof which come within the practice of those skilled in the art to which the invention relates.

I claim:

1. In a fluid pressure servomotor: a sermovotor housing having a forwardly and rearwardly extending chamber therein, a tubular control valve housing in said chamber, said control valve housing having an internal control chamber opening out of its forward end, a structure the internal sidewalls of which surround the forward end of said tubular control valve housing with the internal bottom surface of said structure spaced forwardly of said tubular control valve housing, a control member positioned in said control chamber, said structure having a generally radially extending flange spaced radially outwardly of said tubular valve housing, a diaphragm having a radially inner section fastened to said tubular valve housing, an intermediate section fastened to said flange of said structure, and an outer section fastened to said servomotor housing in such manner as to allow forward and rearward relative movement between said tubular valve housing, said structure and said servomotor housing to which said diaphragm is fastened, and valve means operated upon forward motion of said control member.

2. In a fluid pressure servomotor: a servomotor housing having a forwardly and rearwardly extending chamber therein, said housing having a rear end wall with an opening therethrough communicating with said chamber; forwardly and rearwardly positioned movable walls in said chamber and extending transversely thereof; the rear face of said forwardly positioned movable wall having a depression therein in alignment with said opening in said rear end wall; a tubular control valve housing in said chamber aligned with said depression and extending rearwardly through said opening in said end wall, said control valve housing having an internal control chamber opening out of its forward end, a structure adapted to fit in and align with the surfaces of said depression, said structure having internal sidewalls which surround the forward end of said tubular control valve housing and an internal bottom surface spaced forwardly of said tubular control valve housing, a control member positioned in said control chamber, said structure having a generally radially extending flange spaced radially outwardly of said tubular valve housing, said rearwardly position movable wall comprising a diaphragm having a radially inner section fastened to said tubular valve housing, an intermediate section fastened to said flange of said structure, and an outer section fastened to said servomotor housing in such manner as to allow forward and rearward relative movement between said tubular valve housing, said structure and said servomotor housing to which said diaphragm is fastened, and valve means operated upon forward motion of said control member.

3. For a servomotor having a housing separated into at least two chambers with a valve structure for controlling a pressure differential between the chambers which valve structure is slidably mounted within and on a closure member, a means to movably unite the housing, valve structure and closure member comprising: a diaphragm and means to individually attach said diaphragm to the housing, the valve structure and the closure member to permit relative movement between the housing, the valve structure and the closure member.

References Cited in the file of this patent

UNITED STATES PATENTS

| | | |
|---|---|---|
| 2,744,502 | Frantz | May 8, 1956 |
| 2,745,383 | Hupp | May 15, 1956 |
| 2,876,627 | Ayers | Mar. 10, 1959 |
| 2,953,120 | Ayers | Sept. 20, 1960 |
| 2,976,846 | Stelzer | Mar. 28, 1961 |
| 3,013,536 | Cripe | Dec. 19, 1961 |
| 3,016,880 | Kellogg et al. | Jan. 16, 1962 |